United States Patent
Zenzen et al.

(10) Patent No.: US 11,448,276 B2
(45) Date of Patent: Sep. 20, 2022

(54) BRAKE LINING RESTORING DEVICE FOR A VEHICLE BRAKE SYSTEM

(71) Applicant: ZF Active Safety GmbH, Koblenz (DE)

(72) Inventors: Guido Zenzen, Macken (DE); Marco Becker, Oberdürenbach (DE); Lukas Madzgalla, Lahnstein (DE); Peter Mäurer, Koblenz (DE); Philipp Schwenzer, Urmitz (DE); Paul Wecker, Limburg (DE); Jörg Knieper, Vallendar (DE); Florian Roessinger, Neuwied (DE)

(73) Assignee: ZF Active Safety GmbH, Koblenz (DE)

( * ) Notice: Subject to any disclaimer, the term of this patent is extended or adjusted under 35 U.S.C. 154(b) by 209 days.

(21) Appl. No.: 16/850,092

(22) Filed: Apr. 16, 2020

(65) Prior Publication Data
US 2020/0332850 A1 Oct. 22, 2020

(30) Foreign Application Priority Data
Apr. 16, 2019 (DE) .......................... 102019205500.1

(51) Int. Cl.
*F16D 65/54* (2006.01)
*F16D 65/097* (2006.01)
*F16D 55/226* (2006.01)

(52) U.S. Cl.
CPC ......... *F16D 65/54* (2013.01); *F16D 65/0979* (2013.01); *F16D 55/226* (2013.01)

(58) Field of Classification Search
CPC .... F15D 55/226; F15D 55/227; F15D 55/228; F15D 55/2265; F16D 65/0006; F16D 65/095; F16D 65/097; F16D 65/0972; F16D 65/0973; F16D 65/0977; F16D 65/0978; F16D 65/0979; F16D 65/54; F16D 65/0976; F16D 65/0975; F16D 2055/0041;
(Continued)

(56) References Cited

U.S. PATENT DOCUMENTS 4,269,290 A * 5/1981 Thiel ....................... F16D 65/18
188/72.3
4,684,002 A * 8/1987 Takeuchi .............. F16D 13/757
192/111.4
(Continued)

FOREIGN PATENT DOCUMENTS

DE 2536619 A1 2/1977
DE 102009060204 A1 6/2011
(Continued)

*Primary Examiner* — Robert A. Siconolfi
*Assistant Examiner* — San M Aung
(74) *Attorney, Agent, or Firm* — Robert James Harwood

(57) ABSTRACT

A brake lining restoring device includes at least one clamping limb with at least one first aperture, at least one base limb, and at least one clamping limb. The clamping limb and the one base limb may be connected to one another via at least one spring section. The clamping limb may be moved under elastic deformation relative to the at least one base limb. The brake lining restoring device may include a frictionally locking connection to a holding element which is assigned to the brake lining arrangement can be established via one edge (R) of the first aperture of the clamping limb.

17 Claims, 9 Drawing Sheets

(58) Field of Classification Search
CPC .......... F16D 2055/007; F16D 2055/40; F16D 2055/543; F16D 2065/1396; F16D 2127/02; F16D 2129/04; F16D 2200/0021; F16D 2250/005
USPC .............. 188/196 P, 73.38, 73.1, 73.2, 72.3; 267/160
See application file for complete search history.

(56) References Cited

U.S. PATENT DOCUMENTS

| | | | | |
|---|---|---|---|---|
| 4,742,901 A * | 5/1988 | Takeuchi | .............. | F16D 13/757 192/111.4 |
| 2011/0056778 A1 * | 3/2011 | Roth | .................. | F16D 65/0973 188/234 |
| 2014/0367208 A1 * | 12/2014 | Miyake | ................ | F16D 55/227 188/72.3 |
| 2015/0211589 A1 * | 7/2015 | Mallmann | ............. | F16D 65/543 188/73.38 |
| 2015/0247542 A1 * | 9/2015 | Yukumi | .............. | F16D 65/0977 188/72.3 |
| 2016/0116011 A1 * | 4/2016 | Inoue | ..................... | F16D 66/02 188/1.11 W |
| 2017/0299004 A1 * | 10/2017 | Mallmann | .......... | F16D 65/0972 |

FOREIGN PATENT DOCUMENTS

| | | | |
|---|---|---|---|
| DE | 102016209069 A1 | 3/2017 | |
| WO | 2003027526 A1 | 4/2003 | |

* cited by examiner

US 11,448,276 B2

BRAKE LINING RESTORING DEVICE FOR A VEHICLE BRAKE SYSTEM

CROSS-REFERENCE TO RELATED APPLICATION

This application claims priority to German Patent Application No. 102019205500.1, filed Apr. 16, 2019, the disclosure of which is incorporated herein by reference in its entirety.

TECHNICAL FIELD

The present invention relates to a brake lining restoring device for a brake lining arrangement of a vehicle disk brake. Furthermore, the present invention relates to a brake lining arrangement having at least one brake lining restoring device of this type. The invention is likewise directed to a vehicle disk brake having at least one brake lining restoring device.

BACKGROUND

Brake lining restoring devices are known from the prior art and are disclosed, for example, in document WO 03/027526 A1. Said document discloses a brake lining arrangement having a friction lining and a carrier plate for the friction lining. A restoring mechanism for the brake lining arrangement comprises a pin and a clip. The pin is fastened to the carrier plate and extends through an opening in the clip.

SUMMARY

It is an object of the present invention to provide a brake lining restoring device, by way of which a position of a brake lining arrangement relative to a brake disk can be adjusted in a manner which is dependent on the wear of a friction lining.

Said object is achieved by way of a brake lining restoring device having the features of claim 1. Further embodiments are specified in the dependent claims.

The brake lining restoring device according to the invention comprises at least one clamping limb and at least one base limb. The at least one clamping limb has at least one first aperture. The at least one clamping limb and the at least one base limb are connected to one another via at least one spring section, it being possible for the at least one clamping limb to be moved with elastic deformation relative to the at least one base limb. The brake lining restoring device is configured in such a way that a frictionally locking connection to a holding element which is assigned to the brake lining arrangement can be established via an edge of the first aperture of the at least one clamping limb, the brake lining restoring device being configured, furthermore, such that the frictionally locking connection can be released by way of a relative movement of the at least one clamping limb in the direction of the at least one base limb, which relative movement exceeds a predefined travel.

An "automatic" compensation of the wear of the friction lining of a brake lining arrangement can be achieved by way of the restoring device according to the invention. The position of the brake lining arrangement can approach the brake disk for the compensation of the wear. Long pedal idle travels of the brake pedal can be avoided by way of the compensation of the wear or the abrasion on the friction lining.

In the starting position of the at least one clamping limb relative to the at least one base limb, the frictionally locking connection between the edge of the first aperture of the at least one clamping limb and the at least one pin-shaped or bolt-shaped holding element reaches its maximum value and can therefore absorb the reaction forces completely. As soon as the clamping limb approaches the base limb during a movement of the brake lining arrangement, which movement is active for braking purposes, the frictionally locking connection can decrease on account of the reaction forces which act. Said decreases in the frictionally locking connection can take place continuously in a manner which is dependent on the travel of the relative movement between the clamping limb and the base limb. Here, the brake lining restoring device can be configured in such a way that, if a predefined travel of the relative movement between the clamping limb and the base limb is exceeded, the frictionally locking connection can no longer withstand the reaction forces which act at this time, as a result of which an interruption in the frictionally locking connection occurs. On account of the interruption in the frictionally locking connection, the clamping limb and the holding element can move "independently" of one another. Accordingly, the clamping limb can be relieved at least partially after the interruption of the frictionally locking connection on account of the spring force which is provided by the brake lining restoring device, and can move away from the at least one base limb. The at least one clamping limb can be moved away from the base limb until the friction between the edge of the aperture of the clamping limb and the holding element can withstand the reaction forces. The brake lining arrangement will move in the direction of the brake disk until the friction can withstand the reaction forces again. The movement of the brake lining arrangement in the direction of the brake disk forms the conclusion of the wear compensation.

As long as the relative movement of the clamping limb in the direction of the base limb does not exceed a predefined travel, the brake lining restoring device provides a restoring force, in order for it to be possible for the brake lining arrangement to be restored into its starting position. If the relative movement exceeds the predefined travel, for example on account of a wear-induced long movement travel of the brake lining arrangement in the direction of the brake disk, the frictionally locking connection between the clamping limb and the holding element is canceled. The brake lining arrangement can then be moved "freely" onto the brake disk, in order to reset the starting position or the starting location of the brake lining arrangement relative to the brake disk. As a result, the wear on the friction lining can be compensated for, in order to prevent long pedal idle travels.

The preceding comments can be summarized as follows: during a movement of the brake lining arrangement, which movement is active in terms of braking, the clamping limb can follow the movement of the brake lining arrangement with elastic deformation. After the release of the vehicle disk brake, the elastically deformed clamping limb can move back into its original starting position on account of the spring force which is provided by the brake lining restoring device. As a result, the brake lining arrangement which is coupled to the clamping limb can be moved away from the brake disk, that contact of the friction lining which is active in terms of braking with the brake disk being interrupted. The brake lining arrangement can always be reset into its predefined starting position relative to the brake disk. In the case of progressing wear of the brake lining arrangement, the air play can increase continuously, that is to say the spacing of the friction lining from the brake disk. The air play which increases continuously can be compensated for by the driver only by way of a longer brake pedal stroke which is perceived by the driver as a pedal idle travel without effect. In order to avoid this state, the predefined starting position of the brake lining arrangement can be adapted to the wear state of the friction lining by way of the brake lining restoring device according to the invention, it being possible for the starting position of the brake lining arrangement to be moved in the direction of the brake disk by way of the brake lining restoring device. For this reason, the brake lining restoring device is configured to interrupt the frictionally locking connection between the edge of the aperture of the clamping limb and the holding element as soon as the pedal idle travel exceeds a predefined magnitude or a predefined travel, it being possible for the associated exceeding of the predefined travel of the relative movement of the clamping limb in the direction of the base limb to bring about the interruption of the frictionally locking connection.

The at least one base limb can have at least one second aperture. The second aperture of the base limb can be greater in terms of area than the first aperture of the clamping limb. The base limb can extend substantially at a right angle with respect to the associated holding element. When the clamping limb is moved in the direction of the base limb, the first aperture and the second aperture can lie above one another. It is possible that the first aperture and the second aperture can be moved into a congruent state by way of an approach of the clamping limb to the base limb. In this state, the frictionally locking connection can be canceled completely. The first aperture and the second aperture can be configured on the at least one clamping limb and the at least one base limb in such a way that they can be penetrated by the at least one holding element.

The clamping limb and the base limb can extend at a predefined angle with respect to one another. The predefined angle can be, in particular, an acute angle. The clamping limb and the base limb can have faces which face one another. On account of the predefined angle, the spacing between the clamping limb and the base limb can increase in the direction of the free ends of the clamping limb and the base limb. The angle can be open in the direction of the free ends of the clamping limb and the base limb. As an alternative, the angle can be open in the direction of the spring section. The clamping limb and the base limb can be arranged behind one another in the actuating direction. The clamping limb can be arranged in front of or behind the base limb in the actuating direction.

The at least one clamping limb can have a fastening section which has a first fastening opening. The at least one base limb can have at least one second fastening opening. The first and the second fastening opening can serve to fasten the brake lining restoring device to a brake lining carrier plate of a brake lining arrangement. The spring section can be configured in such a way that it provides a prestress, by way of which the edge of the first aperture can be pressed against the holding element in order to establish a frictionally locking connection.

The fastening section of the clamping limb can be capable of being brought into contact with the base limb. The predefined angle between the clamping limb and the base limb can be set when the fastening section of the clamping limb is in contact with the base limb. In this case, the predefined angle can be open in the direction of the spring section.

The brake lining restoring device can have at least one positioning section which serves to position the brake lining restoring device on a brake lining arrangement. The at least one positioning section can extend in a manner which is angled away with respect to the base limb. The positioning section can bear against a contour edge of a brake lining carrier plate, and can thus position the brake lining restoring device on the brake lining carrier plate.

The brake lining restoring device can have a brake lining guide element which is connected to the base limb. The brake lining restoring device can be configured in one piece with the brake lining guide element. The brake lining guide element can be received at least in sections in a guide recess of a brake carrier and can thus be attached to the brake carrier. The brake lining restoring device can be capable of being fastened to the brake carrier via the brake lining guide element. The base limb can be supported in a manner which is angled away with respect to the brake lining guide element. The base limb can be supported at least in sections on the brake carrier. To this end, the base limb can have at least one supporting element. The at least one supporting element can be configured in the form of a bulge on the base limb. The base limb can be supported in a punctiform manner or in sections on the brake carrier by way of the at least one supporting element.

Furthermore, the present invention relates to a brake lining arrangement for a vehicle disk brake. The brake lining arrangement has a brake lining carrier plate and at least one friction lining which is attached to the brake lining carrier plate. Furthermore, the brake lining arrangement has a brake lining restoring device.

The brake lining carrier plate can have at least one holding element. Via the at least one holding element, the brake lining arrangement can be capable of being coupled to the brake lining restoring device. The at least one holding element can be attached to the rear side of the brake lining carrier plate, that is to say to that side of the brake lining carrier plate which faces away from the friction lining. The at least one holding element can be of bolt-shaped configuration. Projections which extend in the direction of the longitudinal axis can be configured laterally next to the friction lining on the brake lining carrier plate. The at least one holding element can be attached in the region of one of said projections. Each of the projections can be provided with a holding element. In order for it to be possible for the holding element to be coupled to the brake lining restoring device, the clamping limb can be moved in the direction of the base limb with elastic deformation of the spring section. In this state, the first aperture of the clamping limb and the second aperture of the base limb can be approximately congruent. The holding element can be guided through the two apertures. On account of the prestress which is provided by the spring section, the clamping limb can press the edge of its aperture against the outer face of the holding element and can thus establish a frictionally locking connection to the holding element.

At least one fastening projection can be configured on the front side of the brake lining carrier plate. The brake lining restoring device can be fastened to the brake lining carrier plate by way of the fastening projection. The brake lining restoring device can be plugged onto the fastening projection and can be fastened to it. In order to plug it onto the fastening projection, the first fastening opening can be provided on the fastening section of the clamping limb and the second fastening opening can be provided on the base limb. The brake lining restoring device can be attached to the fastening projection via a fastening disk.

Furthermore, the present invention relates to a vehicle disk brake having at least one brake carrier and at least one brake lining restoring device or a brake lining arrangement of the above-described type.

The vehicle disk brake can have the at least one holding element which can be coupled to the at least one brake lining restoring device. The at least one holding element can be connected to the brake carrier. The at least one holding element can be received at least in sections in openings in the brake carrier. The brake lining arrangement can be guided movably on the at least one holding element. The at least one holding element can extend through an opening in the brake lining carrier plate of the brake lining arrangement and through the apertures of the brake lining restoring device. The brake lining restoring device can couple the brake lining arrangement to the holding element via a frictionally locking connection. The at least one holding element can be attached fixedly to a brake carrier.

BRIEF DESCRIPTION OF THE DRAWINGS

In the following text, two exemplary embodiments of the present invention will be described with reference to the appended figures, in which.

DETAILED DESCRIPTION

Figure 1:
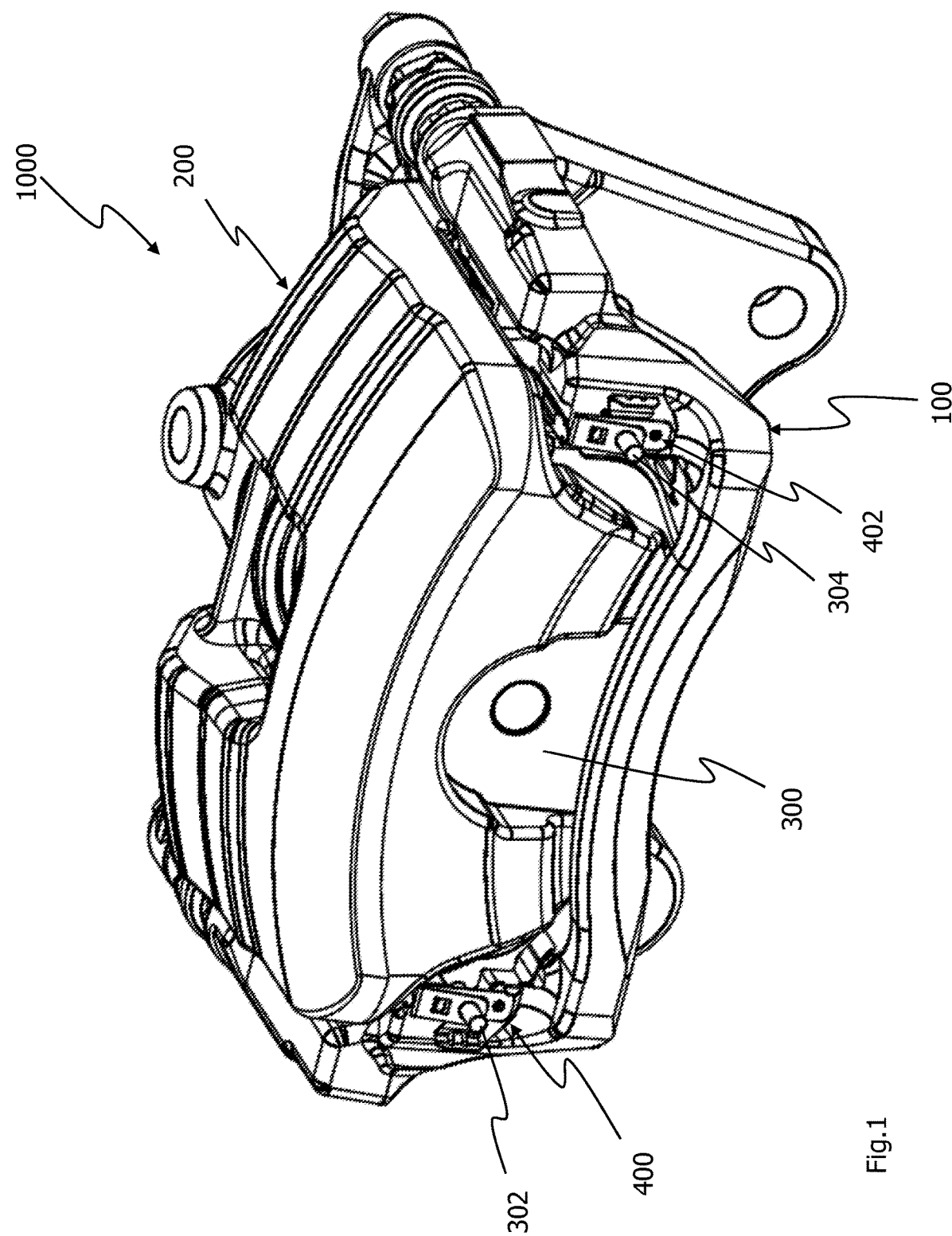
FIG. 1 shows a perspective view of a vehicle disk brake having a brake lining restoring device in accordance with a first exemplary embodiment.

FIG. 1 shows a vehicle disk brake 1000 having a brake carrier 100 and a hydraulic and/or electromechanical actuator 200. The brake carrier 100 can be attached rigidly to a vehicle (not shown). The actuator 200 can be connected in a floating manner to the brake carrier 100. In order to carry out a braking operation, the actuator 200 can bring a brake lining arrangement 300 into engagement with a side face of a brake disk (not shown in FIG. 1). In order for it to be possible for the brake lining arrangement 300 to be moved back into its starting position after the braking operation, brake lining restoring devices 400 and 402 are provided. The brake lining restoring devices 400 and 402 can be supported on the brake carrier 100, and are coupled to the brake lining arrangement 300 via pin-shaped or bolt-shaped holding elements 302 and 304.

Figure 2:
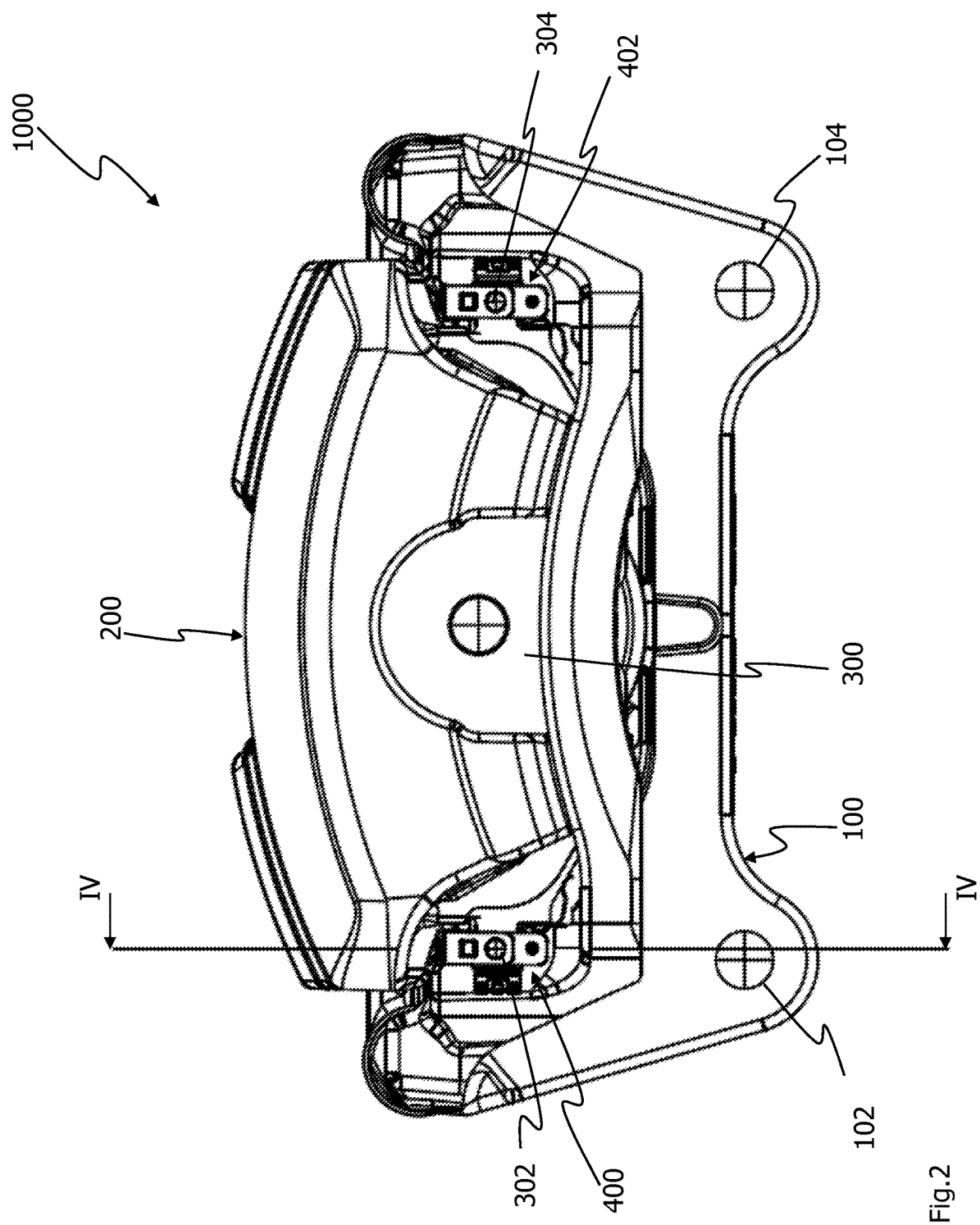
FIGS. 2 and 3 show further views of the vehicle disk brake according to FIG. 1.

FIG. 2 shows a front view of the vehicle disk brake 1000. Openings 102 and 104 are configured in the brake carrier 100, which openings 102 and 104 serve to connect the brake carrier 100 rigidly to the vehicle. The actuator 200 which is mounted in a floating manner is provided on the brake carrier 100, which actuator 200 can act on the brake lining arrangement 300. The brake lining restoring devices 400 and 402 can be seen laterally next to the actuator 200. The brake lining restoring devices 400 and 402 are coupled to the brake lining arrangement 300 via the holding elements 302 and 304. The brake lining restoring devices 400 and 402 are fastened to the brake carrier 100. The brake lining restoring devices 400 and 402 extend on an outer side of the brake carrier 100.

Figure 3:
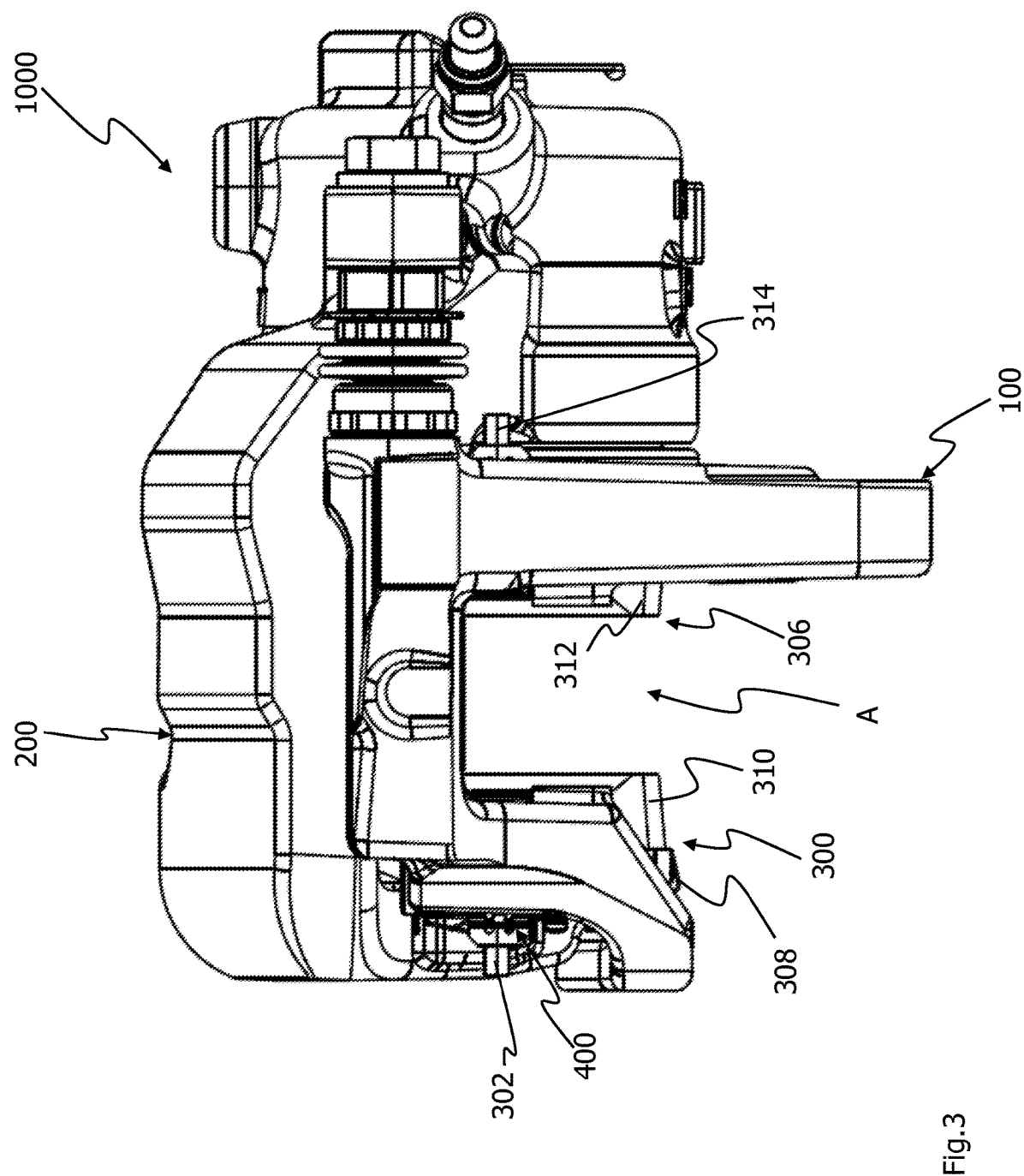

FIG. 3 shows a side view of the vehicle disk brake 1000 having the brake carrier 100 and the actuator 200. The brake carrier 100 defines a receiving region A for a brake disk (not shown in FIG. 3). Furthermore, the brake carrier 100 receives the brake lining arrangements 300 and 306. The brake lining arrangement 300 has a brake lining carrier plate 308 and a friction lining 310 which is attached to it. Only the friction lining 312 can be seen of the brake lining arrangement 306 in FIG. 3, which friction lining 312 is attached to a brake carrier plate (not shown) of the brake lining arrangement 306. The holding element 302 is arranged on the brake lining carrier plate 308. The holding element 314 is provided on the brake lining carrier plate (not shown in FIG. 3) of the brake lining arrangement 306. The holding elements 302 and 314 are coupled to the brake lining restoring devices 400 and 402.

Figure 4:
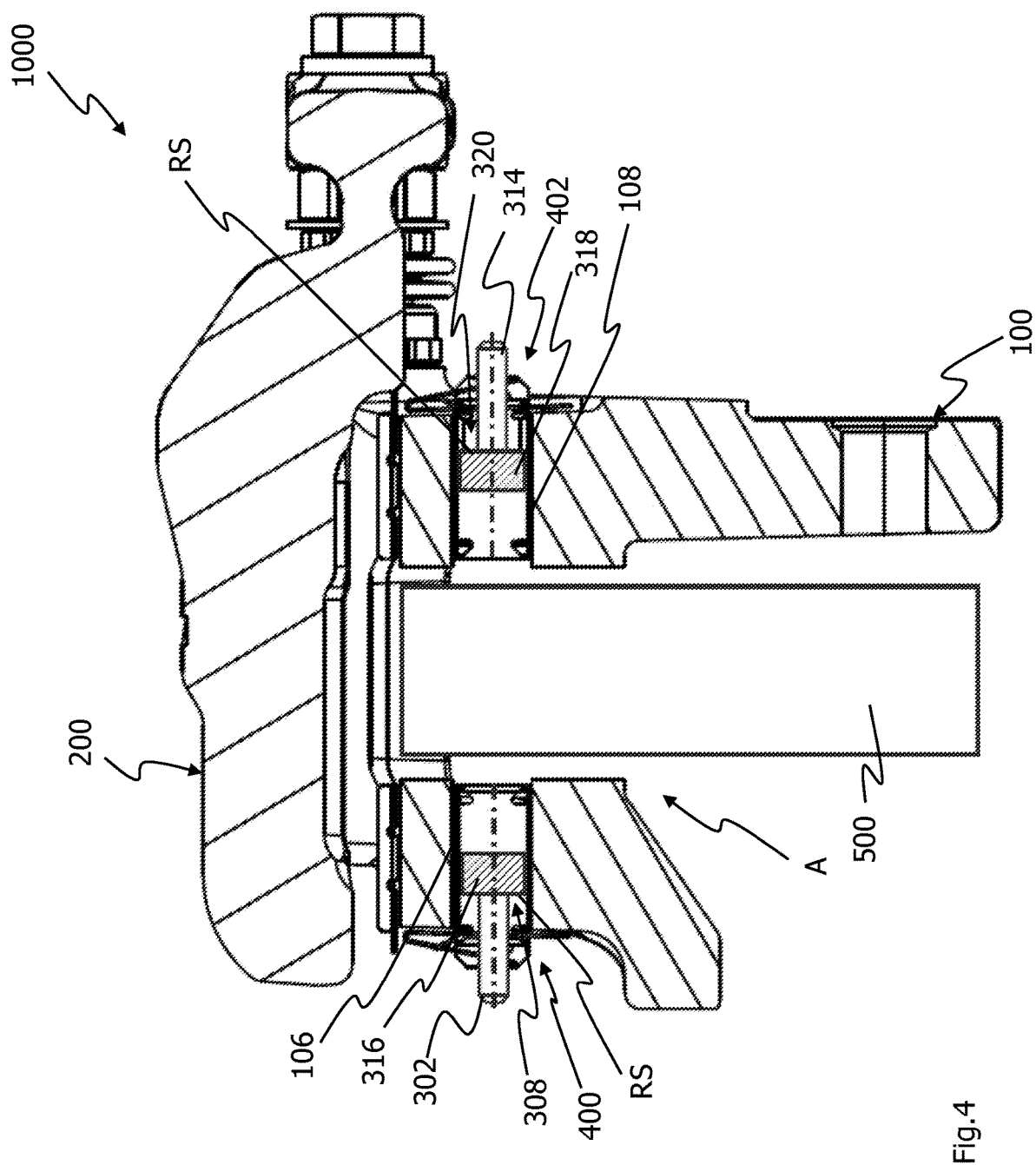
FIG. 4 shows a sectional view along the sectional line IV-IV in FIG. 2.

FIG. 4 shows a sectional view along the sectional line IV-IV in FIG. 2. Guide recesses 106 and 108 are configured on the brake carrier 100, in which guide recesses 106 and 108 projections 316 and 318 of the brake lining carrier plates 308 and 320 are guided movably. The holding elements 302 and 314 are arranged on the projections 316 and 318 of the brake lining carrier plates 308 and 320. The holding elements 302 and 314 are of bolt-shaped or journal-shaped configuration. The holding elements 302 and 314 are attached to a side of the brake lining carrier plates 308 and 320 which faces away from the brake disk 500, and therefore on the rear side RS of the brake lining carrier plates 308, 320. The brake lining restoring devices 400 and 402 are supported on the brake carrier 100, and are coupled to the holding elements 302 and 314 of the brake lining carrier plates 308 and 320.

Figure 5:
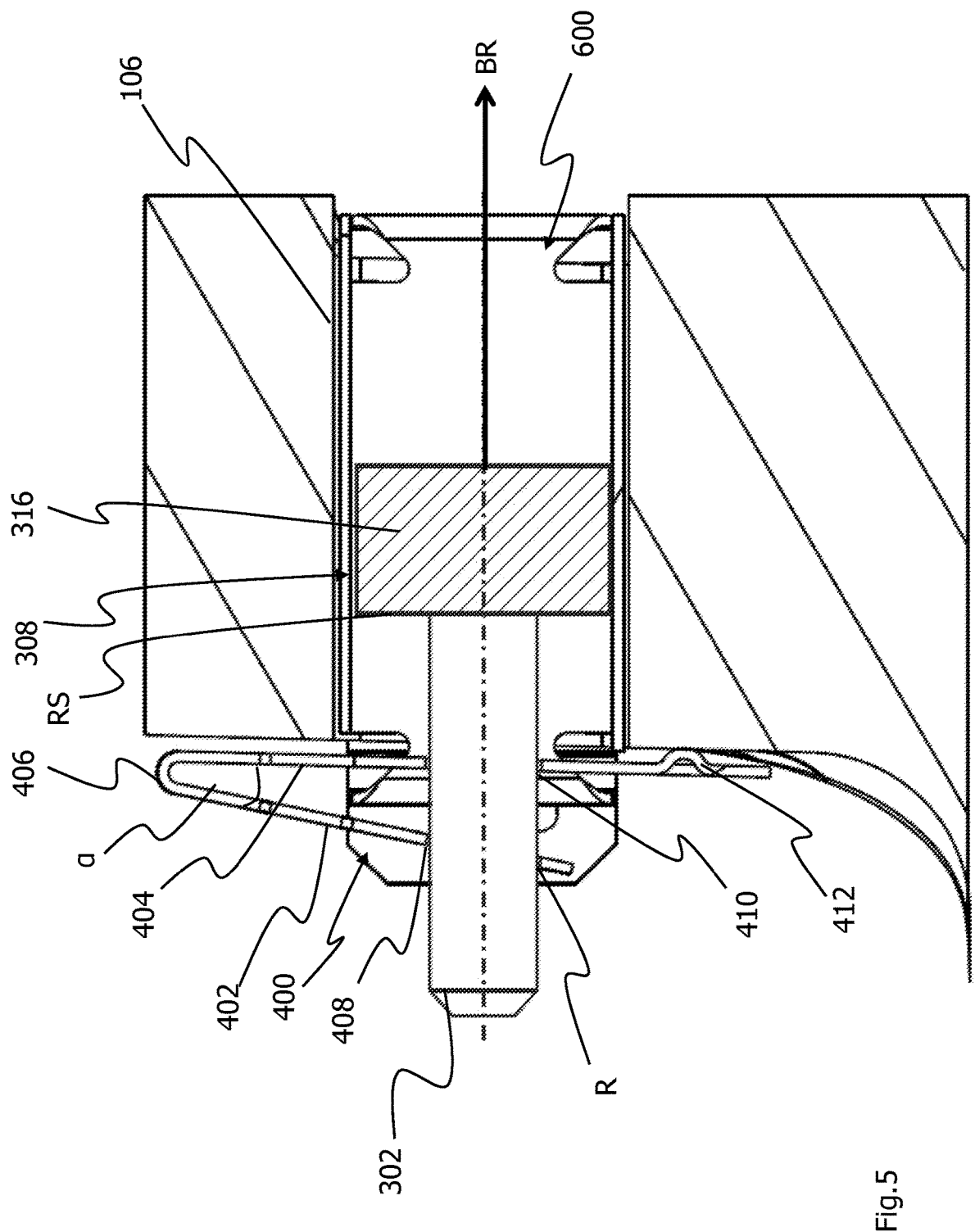
FIG. 5 shows an enlarged detail from the sectional view according to FIG. 4.

FIG. 5 shows an enlarged detail from FIG. 4. The holding element 302 is attached to the projection 316 on the rear side RS of the brake lining carrier plate 308. The holding element 302 is of bolt-shaped configuration. The holding element 302 is coupled to the brake lining restoring device 400. The brake lining restoring device 400 has a clamping limb 402 and a base limb 404. The clamping limb 402 and the base limb 404 are connected to one another via a spring section 406. The spring section 406 is of curved configuration. The spring section 406 connects the clamping limb 402 and the base limb 404 to one another in such a way that the clamping limb 402 and the base limb 404 extend at a predefined angle α with respect to one another. The angle α is fixed between the clamping limb 402, the base limb 404 and the spring section 406. The angle α is open in the direction of the free ends of the clamping limb 402 and the base limb 404.

The clamping limb 402 has an aperture or an opening 408. The base limb 404 has an aperture or opening 410. The apertures 408 and 410 are positioned on the clamping limb 402 and the base limb 404 in such a way that they can be penetrated by the bolt-shaped holding element 302. The base limb 404 has a bulge 412, via which the brake lining restoring device 400 can be supported on the brake carrier 100.

In the case of the exemplary embodiment which is shown, the brake lining restoring device 400 is connected to a brake lining guide element 600. The brake lining restoring device 400 can also be configured separately from the brake lining guide element 600 as a separate component, however. The guide element 600 is arranged at least in sections in the guide recess 106 of the brake carrier 100 and is fastened to the brake carrier 100. The guide element 600 serves to guide the projection 316 of the brake lining carrier plate 308 and therefore to guide the movement of the brake lining arrangement 300. The base limb 404 connects the brake lining restoring device 400 to the guide element 600. The base limb 404 extends in an angled-away manner with respect to the brake lining guide element 600. The brake lining restoring device 400 can be fastened to the brake carrier 100 via the brake lining guide element 600.

The clamping limb 402 can establish a frictionally locking connection to the holding element 302 via the edge of the aperture 408. The prestress of the spring section 406 presses the edge R against the outer face of the holding element 302. The frictionally locking connection couples the brake lining restoring device 400 to the holding element 302 and therefore to the brake lining arrangement 300, of which only the projection 316 of the brake lining carrier plate 308 can be seen in FIG. 5. During the mounting, the clamping limb 402 is moved closer to the base limb 404. The apertures 408 and 410 are then approximately congruent. In said state, the holding element 302 can be guided through the apertures 402 and 404. If the clamping limb 402 is released, the prestress of the spring section 406 presses the edge R of the clamping limb 402 against the outer face of the holding element 302 and thus establishes the frictionally locking connection to the holding element 302.

In the case of a movement of the brake lining arrangement 300 or the projection 316 of the brake lining carrier plate 308 in the actuating direction BR, that is to say in the direction of the brake disk 500 (see FIG. 4), the clamping limb 402 which is coupled in a frictionally locking manner to the holding element 302 first of all follows the movement of the brake lining arrangement 300 with elastic deformation of the spring section 406. Here, the clamping limb 402 is moved relative to the base limb 404 and approaches the base limb 404 under elastic deformation of the spring section 406. As a result of the approach of the clamping limb 402 to the base limb 404, the angle α decreases, as a result of which the frictional forces between the edge R of the aperture 408 and the holding element 302 are also reduced. In the actuating direction BR, that is to say in the direction of the arrow BR, the clamping limb 402 is arranged in front of the base limb 404.

In the case of a relative movement of the clamping limb 402 relative to the base limb 404 over a predefined travel, the frictional forces always remain so great that the frictionally locking connection between the clamping limb 402 and the holding element 302 is maintained. If said predefined travel is exceeded, for example on account of a great movement travel of the brake lining arrangement 300 in the direction of the brake disk 500 (see FIG. 4), the frictionally locking connection between the edge R of the aperture 408 and the holding element 302 can be canceled or released. In the case of a great movement travel of this type, the brake lining arrangement 300 can be moved "freely" with its holding element 302 relative to the brake lining restoring device 400 and relative to the clamping limb 402. The brake lining arrangement 300 can approach the brake disk 500. As a result, the action point of the edge R of the aperture 408 of the clamping limb 402 on the holding element 302 also changes. The new action point will lie closer to the end 320 of the holding element 302 than the original action point, with the result that the friction face of the friction lining is situated closer to the brake disk 500 even in the non-actuated state (see FIG. 4). The starting position or the starting location of the brake lining arrangement 300 relative to the brake disk 500 (see FIG. 4) has been adjusted or reset. As a result, the wear of the friction lining can be compensated for, in order to avoid long pedal idle travels of the brake pedal (not shown).

Figure 6:
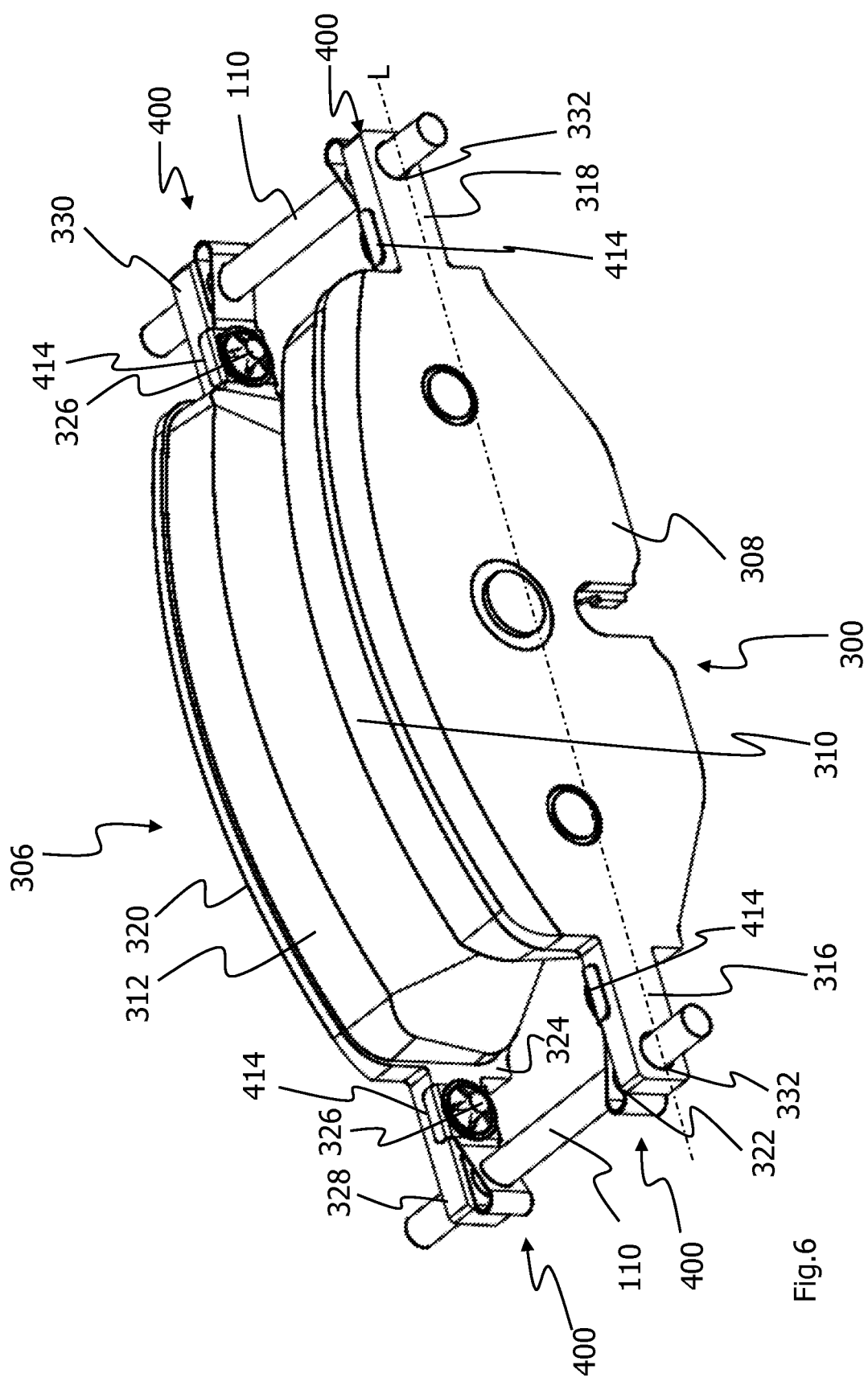
FIG. 6 shows a perspective view of two brake lining arrangements having brake lining restoring devices which are attached to them in accordance with a second exemplary embodiment.

FIG. 6 shows a perspective view of two brake lining arrangements 300 and 306. The brake lining arrangement 300 has the brake lining carrier plate 308 and the friction lining 310 which is attached to it. The brake lining arrangement 306 has the friction lining 312 which is attached to the brake lining carrier plate 320. The friction linings 310 and 312 are arranged on the front sides 322 and 324 of the brake lining carrier plates 308 and 320. In accordance with said exemplary embodiment, the brake lining restoring devices 400 are also arranged on the front sides 322 and 324 of the brake lining carrier plates 308 and 320.

The brake lining restoring devices 400 are attached to fastening projections 326 on the front sides 322 and 324 of the brake lining carrier plates 308 and 320. The brake lining restoring devices 400 couple the brake lining arrangements 300 and 306 to the holding elements 110 and 112. In the mounted state, the holding elements 110 and 112 are connected fixedly to the brake carrier 100 (see FIG. 1). The brake lining restoring devices 400 are attached to the projections 316, 318, 328 and 330 of the brake lining carrier plates 310 and 320, which projections 316, 318, 328 and 330 extend laterally next to the friction linings 310 and 312. The projections 316, 318, 328 and 330 in each case have an opening 332, through which the bolt-shaped holding elements 110 and 112 extend. The projections 316 and 318 on the brake lining carrier plate 308 and the projections 328 and 330 on the brake lining carrier plate 320 are spaced apart from one another in a relatively wide manner in the direction of the longitudinal axis L of the brake lining arrangements 300 and 306. In that state of the brake lining arrangements 300 and 306 in which they are mounted on the disk brake, the projections 316, 318, 328 and 330 are situated above the brake disk which is assigned to the brake lining arrangements 300 and 306.

Figure 7:
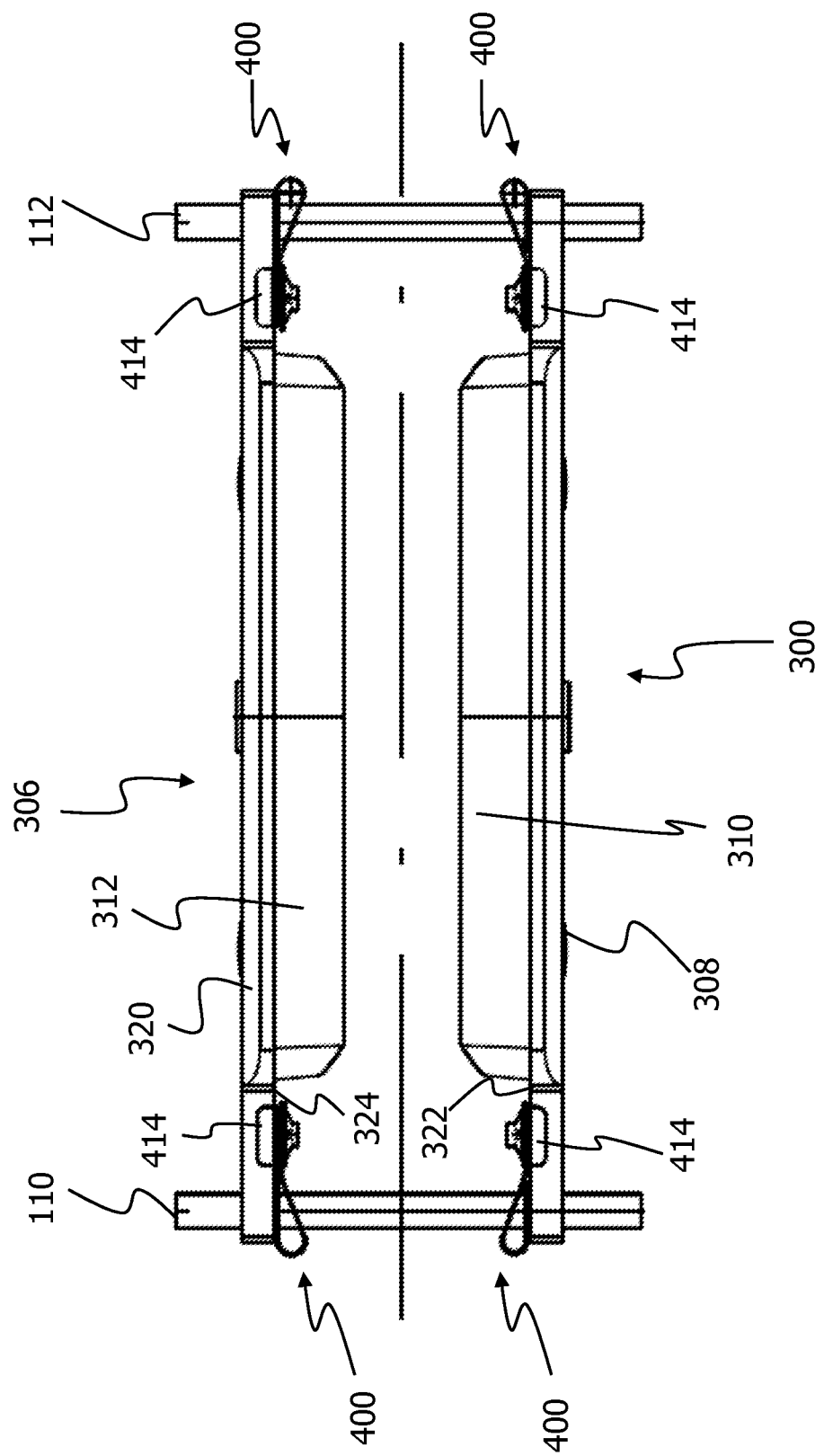
FIG. 7 shows a plan view of the arrangement according to FIG. 6.

FIG. 7 shows a plan view of the arrangement according to FIG. 6. The friction linings 310 and 312 of the brake lining arrangements 300 and 306 lie opposite one another, and can be brought into engagement with the side faces of a brake disk (not shown in FIG. 7). The holding elements 110 and 112 extend through openings in the projections 316, 318, 328 and 330 and through the apertures in the brake lining restoring devices 400. The brake lining restoring devices 400 are arranged on the front sides 322 and 324 of the brake lining carrier plates 308 and 320. The brake lining restoring devices 400 have positioning sections 414 which bear against the contour edges of the brake lining carrier plates 308 and 320 in the region of the projections 316, 318, 328 and 330, in order to position the brake lining restoring devices 400 on the projections 316, 318, 328, 330.

Figure 8:
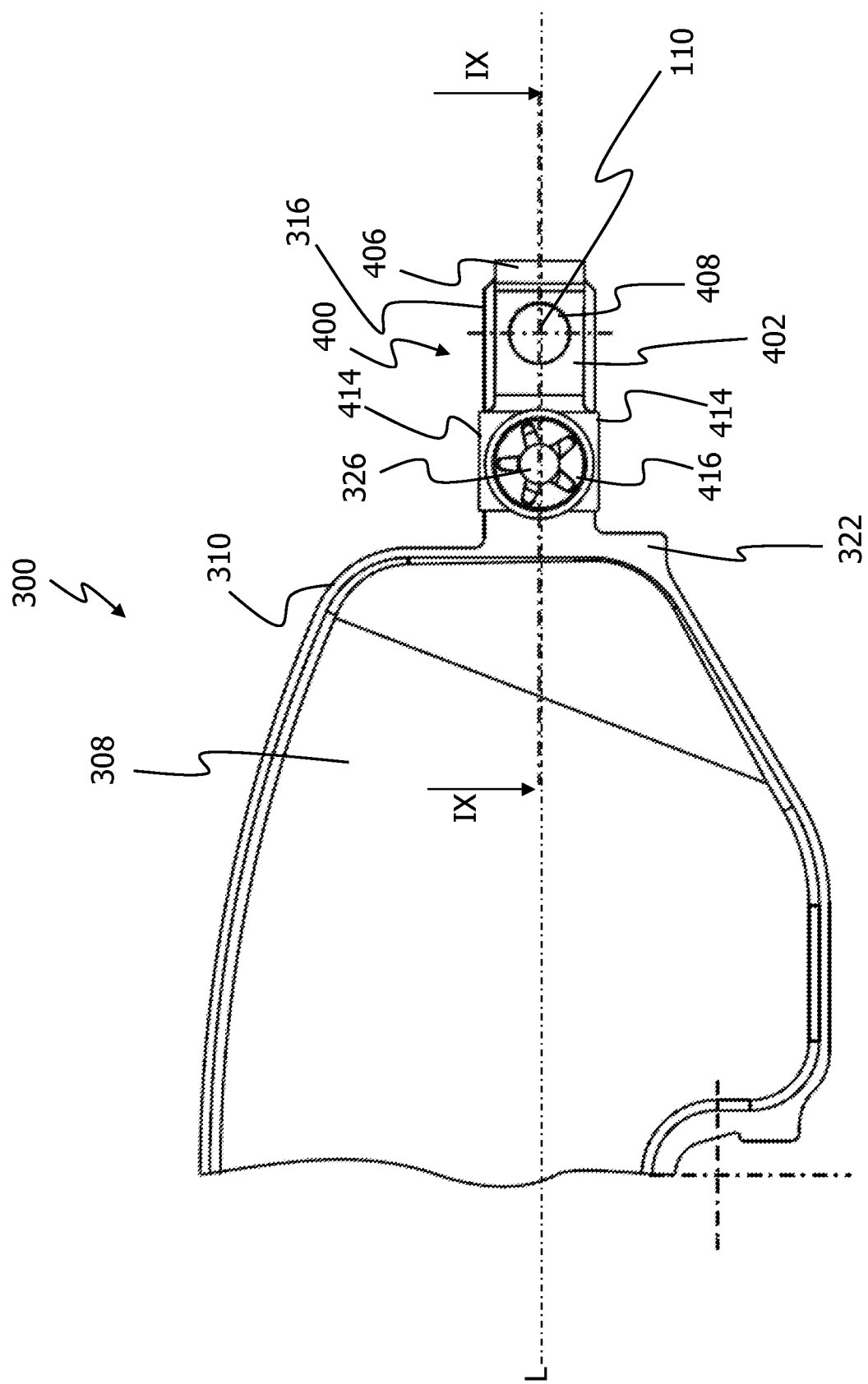
FIG. 8 shows a front view of a brake lining arrangement having the brake lining restoring device which is attached to it in accordance with the second exemplary embodiment.

FIG. 8 shows a detail of a front view of the brake lining arrangement 300. The brake lining restoring device 400 is arranged on the projection 316 of the brake lining carrier plate 310. The brake lining restoring device 400 is attached to the fastening projection 326 via a fastening disk 416 which is in engagement with the fastening projection 326. To this end, the fastening disk 416 has radially inwardly directed claws which act on the fastening projection 326.

The positioning sections 414 lie against the contour edges of the brake lining carrier plate 310 in the region of the projection 316. The aperture 408, through which the brake lining holding element 100 extends, can be seen on the clamping limb 402 of the brake lining restoring device 400. The clamping limb 402 is adjoined by the spring section 406. The projection 316 of the brake lining carrier plate 310 extends in the direction of the longitudinal axis L away from the region of the brake lining carrier plate 308 with the friction lining 310. In the direction of the longitudinal axis L, the fastening projection 326 is arranged closer to the friction lining 308 than the clamping limb 402 with its aperture 408.

Figure 9:
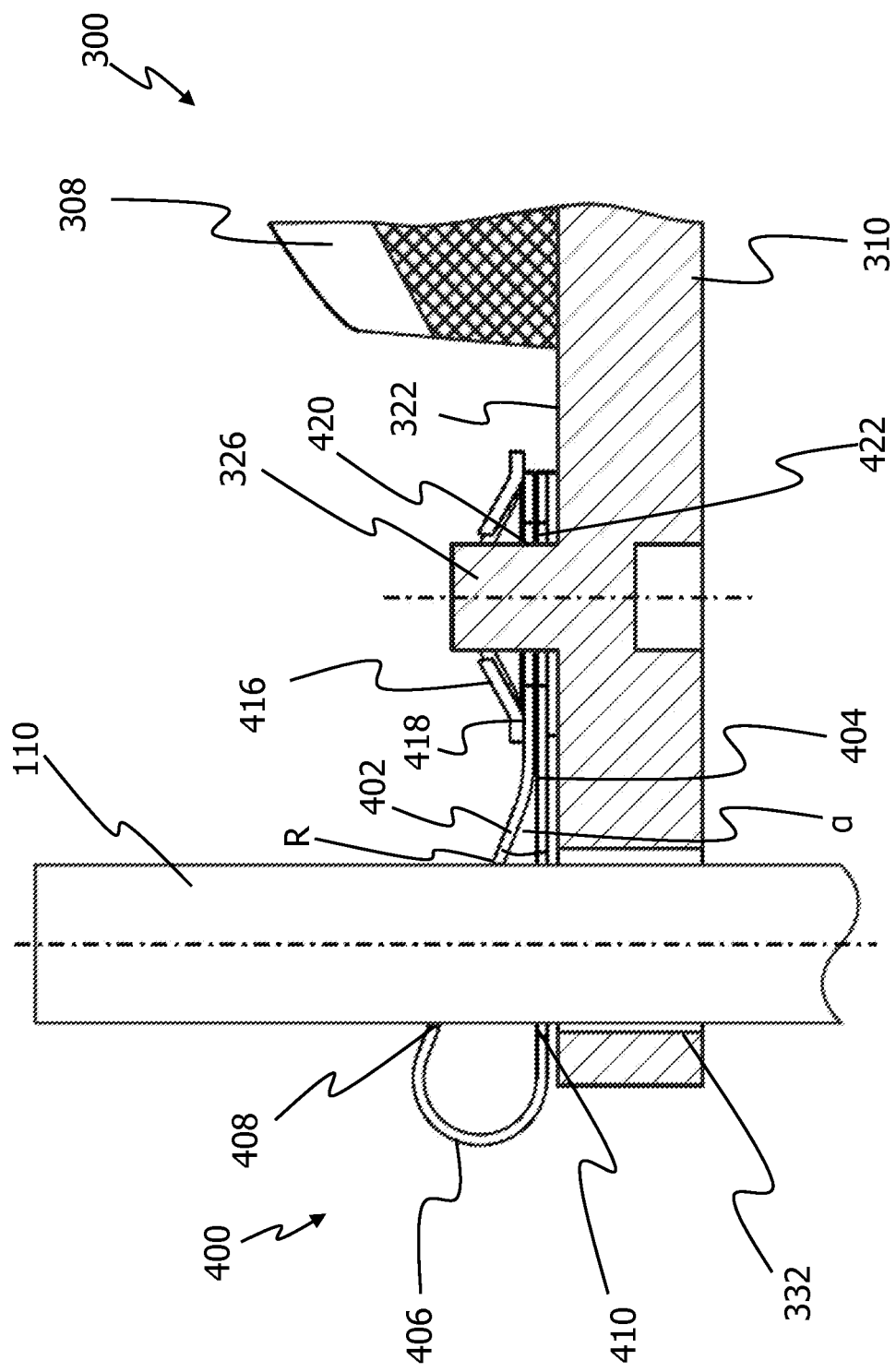
FIG. 9 shows a sectional view along the sectional line IX-IX in FIG. 8.

FIG. 9 shows a sectional view along the sectional line IX-IX in FIG. 8. FIG. 9 shows the brake lining arrangement 300 with the friction lining 310 and the brake lining carrier plate 308. The fastening projection 326 is configured on the front side of the brake lining carrier plate 308. The brake lining restoring device 400 is arranged on the fastening projection 326. Furthermore, an opening 332 is configured in the brake lining carrier plate 308. Both the fastening projection 326 and the opening 332 are configured on the projection 316 of the brake lining carrier plate 310.

The brake lining restoring device 400 is attached to the front side 322 of the brake lining carrier plate 310 in the region of the projection 316. The brake lining restoring device 400 has the clamping limb 402 and the base limb 404. The clamping limb 402 and the base limb 404 are connected to one another via the spring section 406. The spring section 406 is of curved configuration. The clamping limb 402 and the base limb 404 extend at an angle α with respect to one another. The angle α is open in the direction of the spring section 406. The aperture or the opening 408 is configured in the clamping limb 402. The aperture 410 is configured in the base limb 404. The positioning of the opening 332 on the projection 316 of the brake lining carrier plate 310 is adapted to the position of the apertures 408 and 410 in the limbs 402 and 404 of the brake lining restoring device 400 in such a way that the holding element 110 can extend through the opening 332 and the apertures 408 and 410.

The clamping limb 402 is connected to a fastening section 418 which has an opening 420. The base limb 404 likewise has an opening 422. By way of the openings 420 and 422, the brake lining restoring device 400 can be plugged onto the pin-shaped projection 326 on the brake lining carrier plate 310. The brake lining restoring device 400 is fastened to the fastening projection 326 via the fastening disk 416. To this end, the fastening disk 416 bears in sections against the connecting section 418. The base limb 404 can bear in sections against the front side 322 of the brake lining carrier plate 310.

The clamping limb 402 can establish a frictionally locking connection with the holding element 110 via its aperture 408 or via the edge R of the aperture 408. The spring section 406 provides a predefined prestress, by way of which the edge R of the aperture 408 of the clamping limb 402 is pressed against the outer face of the holding element 110. As a result, a frictionally locking connection is generated between the clamping limb 402 and the holding element 110, which frictionally locking connection couples the brake lining arrangement 300 to the holding element 110 via the brake lining restoring device 400.

In the case of a braking operation, the brake lining arrangement 300 is moved in the actuating direction BR. In the actuating direction BR, that is to say in the direction of the arrow BR, the clamping limb 402 is arranged behind the base limb 404. The clamping limb 404 approaches the base limb 402 under an elastic deformation of the spring section 406. Here, the angle α between the clamping limb 402 and the base limb 404 is reduced. As a result of the reduction of the angle α, the frictional forces between the edge R of the aperture 408 of the clamping limb 402 are reduced in a manner which is dependent on the movement travel. If a predefined travel of the relative movement of the clamping limb 402 in the direction of the base limb 404 is exceeded, for example on account of a wear-induced long movement travel of the brake lining arrangement 300 in the direction of the brake disk, the frictionally locking connection between the clamping limb 402 and the holding element 110 is canceled. The brake lining arrangement 300 can then be moved together with the brake lining restoring device 400 along the holding element 110 in the actuating direction BR, the action point of the aperture 408 of the clamping limb 402 on the outer circumferential face of the holding element 110 changing. The action point of the edge R of the aperture 408 of the clamping limb 402 on the holding element 110 approaches the brake disk (not shown in FIG. 9). As a result, the starting position of the brake lining arrangement 300 relative to the brake disk can be reset.

Long pedal idle travels of the brake pedal can be avoided by way of the brake lining restoring device 400 in accordance with the invention, since the starting position of the brake lining arrangement 300 relative to the brake disk is reset if the wear on the friction lining 310, 312 of the brake lining arrangement 300 makes this necessary.

What is claimed is:

1. A brake lining restoring device for a brake lining arrangement of a vehicle disk brake, having:
  at least one clamping limb with at least one first aperture,
  at least one base limb,
  the at least one clamping limb and the at least one base limb being connected to one another via at least one spring section, it being possible for the at least one clamping limb to be moved under elastic deformation relative to the at least one base limb,
  the brake lining restoring device being configured in such a way that a frictionally locking connection to a holding element which is assigned to the brake lining arrangement can be established via one edge (R) of the first aperture of the at least one clamping limb,
  the brake lining restoring device being configured, furthermore, in such a way that the frictionally locking connection can be released by way of a relative movement of the at least one clamping limb in the direction of the at least one base limb, which relative movement exceeds a predefined travel.

2. The brake lining restoring device as defined in claim 1, the at least one base limb having at least one second aperture.

3. The brake lining restoring device as defined in claim 2, it being possible for the at least one spring section to be deformed elastically in such a way that the first aperture and the second aperture can be penetrated by the at least one holding element.

4. The brake lining restoring device as defined in claim 1, the at least one spring section providing a prestress which presses the edge (R) of the first aperture against the holding element.

5. The brake lining restoring device as defined in claim 1, the clamping limb and the base limb extending at a predefined angle (α) with respect to one another.

6. The brake lining restoring device as defined in claim 1, the at least one clamping limb having a fastening section which has a first fastening opening.

7. The brake lining restoring device as defined in claim 6, the at least one base limb having at least one second fastening opening.

8. The brake lining restoring device as defined in claim 6, it being possible for the fastening section of the clamping limb to be brought into contact with the base limb.

9. The brake lining restoring device as defined in claim 8, the predefined angle ($\alpha$) being set when the fastening section of the clamping limb is in contact with the base limb.

10. The brake lining restoring device as defined in claim 1, the brake lining restoring device having at least one positioning section which serves to position the brake lining restoring device on a brake lining arrangement.

11. The brake lining restoring device as defined in claim 1, the base limb having at least one supporting element.

12. The brake lining restoring device as defined in claim 1, the brake lining restoring device having a brake lining guide element which is connected to the base limb.

13. The braking lining arrangement as defined in claim 1, the relative movement being in a brake apply direction and the edge being configured to have a first action point engaging the holding element prior to the relative movement exceeding the predefined travel, the edge having a second action point different from the first action point and configured to engage the holding element after the relative movement exceeds the predefined travel.

14. A brake lining arrangement for a vehicle disk brake, having:
    a brake lining carrier plate;
    at least one friction lining which is attached to the brake lining carrier plate; and
    a brake lining restoring device further comprising,
        at least one clamping limb with at least one first aperture,
        at least one base limb,
        the at least one clamping limb and the at least one base limb being connected to one another via at least one spring section, it being possible for the at least one clamping limb to be moved under elastic deformation relative to the at least one base limb,
        the brake lining restoring device being configured in such a way that a frictionally locking connection to a holding element which is assigned to the brake lining arrangement can be established via one edge (R) of the first aperture of the at least one clamping limb,
        the brake lining restoring device being configured, furthermore, in such a way that the frictionally locking connection can be released by way of a relative movement of the at least one clamping limb in the direction of the at least one base limb, which relative movement exceeds a predefined travel.

15. The brake lining arrangement as defined in claim 14, at least one fastening projection being configured on the front side of the brake lining carrier plate, to which fastening projection the at least one brake lining restoring device can be fastened.

16. The braking lining arrangement as defined in claim 14, the relative movement being in a brake apply direction and the edge having a first action point engaging the holding element prior to the relative movement exceeding the predefined travel, the edge having a second action point different from the first action point and engaging the holding element after the relative movement exceeds the predefined travel.

17. A brake lining restoring device for a brake lining arrangement of a vehicle disk brake, having:
    a base limb;
    a clamping limb with an aperture defined by an edge; and
    a spring section connecting the clamping limb to the base limb such that the clamping limb is elastically deformable relative to the base limb, wherein the edge is configured to form a frictionally locking connection with a holding element assigned to the brake lining arrangement, the frictionally locking connection being releasable in response to relative movement between the clamping limb and the base limb exceeding a predefined travel in a brake apply direction such that the edge is configured to have a first action point engaging the holding element prior to the relative movement exceeding the predefined travel, the edge having a second action point different from the first action point and configured to engage the holding element after the relative movement exceeds the predefined travel.

* * * * *